(12) United States Patent
Keller et al.

(10) Patent No.: US 9,100,408 B2
(45) Date of Patent: Aug. 4, 2015

(54) METHOD FOR REGISTERING MULTI-CONTACT DEVICES

(75) Inventors: Ralf Keller, Würselen (DE); Andreas Witzel, Herzogenrath (DE); Arne Pehrsson, Huddinge (SE); Stephen Christopher Terrill, Madrid (ES)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1260 days.

(21) Appl. No.: 12/299,278

(22) PCT Filed: May 2, 2006

(86) PCT No.: PCT/EP2006/004097
§ 371 (c)(1),
(2), (4) Date: Jun. 22, 2009

(87) PCT Pub. No.: WO2007/128325
PCT Pub. Date: Nov. 15, 2007

(65) Prior Publication Data
US 2009/0296642 A1   Dec. 3, 2009

(51) Int. Cl.
*H04L 12/66* (2006.01)
*H04L 29/06* (2006.01)
*H04L 29/08* (2006.01)

(52) U.S. Cl.
CPC ...... *H04L 65/1006* (2013.01); *H04L 29/06027* (2013.01); *H04L 67/24* (2013.01)

(58) Field of Classification Search
CPC .............. H04L 65/1006; H04L 29/06067; H04L 67/24; H04L 65/101046; H04L 65/1059; H04L 65/102; H04L 65/1073; H04L 29/06027; H04W 88/06
USPC ........... 455/428, 433, 435.1, 435.2, 455, 448, 455/450, 451, 452.1, 452.2, 453; 370/328–329, 351–357, 341, 360
See application file for complete search history.

(56) References Cited

U.S. PATENT DOCUMENTS 6,954,654 B2 * 10/2005 Ejzak ............................. 455/560
7,730,226 B2 *  6/2010 Gondo et al. ...................... 710/9
(Continued)

FOREIGN PATENT DOCUMENTS

EP          1 643 406 A    4/2006

OTHER PUBLICATIONS

Rosenberg Cisco Systems: "A Data Model for Presence" IETF Standardworking-Draft, Internet Engineering Task Force, IETF, CH, vol. simple, No. 1, Oct. 25, 2004.
(Continued)

*Primary Examiner* — Magdi Elhag

(57) ABSTRACT

A technique is described allowing an IMS enabled network to terminate a communication request directed towards a user device in a well-defined way, even for cases in which multiple registrations for IMS are present that are related to the same physical user device. A method embodiment of this technique comprises registering multiple user agents for one and the same user device, wherein from each user agent contact information including a device ID identifying the user device is provided; and processing a communication request directed towards the user device, the processing comprising identifying multiple identical device IDs of registered contacts, and treating the communication request according to a predetermined handling scheme related to the detection of identical device IDs.

15 Claims, 4 Drawing Sheets

(56) References Cited

U.S. PATENT DOCUMENTS

| | | | |
|---|---|---|---|
| 8,194,634 B2* | 6/2012 | Delker et al. | 370/338 |
| 8,472,376 B2* | 6/2013 | Przybysz | 370/328 |
| 2004/0205192 A1* | 10/2004 | Olson et al. | 709/227 |
| 2005/0190744 A1* | 9/2005 | Sun et al. | 370/352 |
| 2005/0255811 A1* | 11/2005 | Allen et al. | 455/78 |
| 2006/0026288 A1* | 2/2006 | Acharya et al. | 709/227 |
| 2006/0067244 A1* | 3/2006 | Sekaran et al. | 370/252 |
| 2006/0072523 A1* | 4/2006 | Richardson et al. | 370/338 |
| 2006/0239251 A1* | 10/2006 | Bennett et al. | 370/352 |
| 2007/0081518 A1* | 4/2007 | Jain et al. | 370/352 |
| 2007/0153777 A1* | 7/2007 | Coulas et al. | 370/356 |
| 2008/0160995 A1* | 7/2008 | Thiebaut et al. | 455/433 |
| 2009/0052385 A1* | 2/2009 | Sylvain et al. | 370/329 |
| 2010/0008352 A1* | 1/2010 | Przybysz et al. | 370/352 |
| 2010/0232402 A1* | 9/2010 | Przybysz | 370/338 |
| 2010/0272096 A1* | 10/2010 | Witzel et al. | 370/352 |
| 2012/0173736 A1* | 7/2012 | Klein | 709/227 |

OTHER PUBLICATIONS

3GPP TS 23.228 V7.1.0 (Sep. 2005); 3rd Generation Partnership Project; Technical Specification Group Services and System Aspects; IP Multimedia Subsystem (IMS); Stage 2 (Release 7).

3GPP TR 23.806 V1.6.0 (May 2005); 3rd Generation Partnership Project; Technical Specification Group Services and System Aspects; Voice Call Continuity between CS and IMS Study (Release 7).

3GPP TS 24.008 V7.1.0 (Sep. 2005); 3rd Generation Partnership Project; Technical Specification Group Core Network and Terminals; Mobile radio interface Layer 3 specification; Core network protocols; Stage 3 (Release 7).

* cited by examiner

METHOD FOR REGISTERING MULTI-CONTACT DEVICES

TECHNICAL FIELD OF THE INVENTION

The present invention generally relates to the field of communication networks comprising an IMS domain. More specifically, the invention relates to a technique for registering multi-contact user devices in an IMS domain of a mobile network.

BACKGROUND OF THE INVENTION

Mobile networks are currently evolving from pure circuit switched networks towards IP-based networks, and can thus seamlessly be integrated into existing IP-based infrastructure, e.g. the Internet, the World Wide Web and other IP-based communication networks.

Within modern $3^{rd}$ generation mobile networks, besides the Circuit Switched (CS) domain and the Packet Switched (PS) domain, the IP Multimedia Subsystem (IMS) domain has been specified by the $3^{rd}$ Generation Partnership Project (3GPP) as a flexible service delivery platform architecture for the provision of IP multimedia services. One of the main components of the IMS domain is the Call State Control Function (CSCF), performing session setup and termination control for IMS sessions. Whereas a Proxy-CSCF (P-CSCF) terminates a session path at the border of an IMS domain, the main control functionality is located within the serving CSCF (S-CSCF).

For session control and signalling functionalities, such as session initiation, session modification and session termination for IP-based voice calls (VoIP) or multimedia conferences, the IMS uses the Session Initiation Protocol (SIP). SIP offers services similar to telephony protocols such as the ISUP (ISDN User Part), but in an IP context. An important logical entity within the SIP framework, terminating a SIP session towards a user, is the user agent. User agents initiate session requests and are usually their destination.

After registration of a user agent in an IMS domain, the user agent represents a particular user contact. A user may of course register more than just one contact, each contact typically corresponding to a particular user device via which the user would like to be reachable. Mechanisms for selecting one out of multiple registered contacts make use of contact attributes as there are the user capability and the q-value (priority value), which are provided by the user agents during registration. In case a contact with highest priority can be identified, a session request is forwarded by the S-CSCF to the respective P-CSCF. In case of two equally ranked contacts, the incoming session is forked, i.e. forwarded to both contacts, which generally results in parallel ringing at two user devices.

Within the framework described so far, a particular problem arises due to the fact that nowadays there is often no longer a 1:1 relationship between a user device (a piece of hardware supposed to be located near the user) and a user agent (typically a software module representing call or session terminating functionality). With modern multi-contact user devices, it is now possible for the user to register more than one user agent in the network, so that two or more contacts can be associated with one and the same user device. This is different to, for example, GSM networks, where the terminating point for a call is the user device having the required functionality fixedly built into it.

For efficient and flexible service provision it will in the future be generally desirable to place service control into the IMS domain also for services which so far have been provided by other domains. For example, the call and service control for classical speech services is performed so far by the CS domain. Prospected network configurations intend however to place call and service control for these services into the IMS domain. Then a user might have, for example, an IMS client and a CS client on his device. Now both of them require a user agent, i.e. there are two user agents associated to the same user device. In the case of identical or overlapping user capabilities, the S-CSCF will thus fork an incoming communication request to two or more user agents associated with one and the same user device, resulting possibly in an undefined operational state of the user device. Furthermore, in case of conditions such as 'user not reachable' or 'user busy', a redirection mechanism might lead to a redirection of an incoming call to another user agent, but in fact to the same device. Similar problems may arise with two or more IMS clients on the same user device, or in case the user has configured its IMS client for reachability from the CS domain, or in still further configurations.

Accordingly it is an object of the present invention to propose an efficient and reliable mechanism that prevents the undesirable effects illustrated above.

SUMMARY OF THE INVENTION

According to a first aspect of the invention, a method of registering in an IMS enabled network two or more user agents associated with a single multi-contact user device is proposed. The method comprises the step of providing, by each of the two user agents, a device identifier (ID) to the IMS domain, the device ID identifying the user device.

The term "user agent" as used herein is not limited to the corresponding SIP entity but generally denotes a component capable of taking over tasks for a user, and more precisely for a user device or a user client, and for this purpose may be configurable in a user-specific way. In this context, the user agent may for example act as an initiator of communication requests or as destination for communication requests.

A multi-contact user device is a device that provides two or more contact options for setting up a voice, data or multimedia communication, or for being reachable for such a communication. In the present context, a multi-contact user device will typically be associated with more than one user agent.

The user agent of a multi-contact device may be configured to provide a set of contact attributes to the S-CSCF of an IMS domain. The device ID might constitute a new parameter or might be represented by an existing parameter among the set of contact attributes. IMS enabled networks preferably include mobile networks with an IMS domain, but might comprise other network scenarios as well, for example access networks using WLAN, WIFI or WiMAX connected to the IMS domain.

One or more of the user agents may be located in the user device. For example, the user device may host a SIP client for multimedia telephony or other applications. Alternatively, or in addition, one or more user agents may be located in the network (for example residing near, at or associated with a P-CSCF). In this case, the user agent may act for a CS client in the user device. Thus any communication will rely on CS protocols (e.g. 3GPP TS 24.008) between the CS client on the user device and the network node where the user agent is residing, and will probably be SIP based between the user agent and the further entities within the IMS domain (in particular the P-CSCF and the S-CSCF).

The invention is of course not limited to the use of SIP. Other protocols for control and signalling purposes in the field of IP-based services exist already or might exist in the future; an example is the existing H.323 protocol specified by the ITU-T.

In a further variant, the user agent may additionally provide a predetermined user capability value suitable for the delivery of CS services via the IMS domain. A typical value might be "multimedia telephony, audio only". This value might be predetermined in case of user agents specifically designed for the present purpose, or might be controllable by the user or the operator.

The device ID may be derived from a global permanent identifier associated with the user device. In one embodiment of the invention, the IMEI (International Mobile Equipment Identity) might be used. It is however also possible to use another global permanent identifier such as the IMSI (International Mobile Subscriber Identity) for that purpose.

According to a further aspect of the invention, a method of controlling a communication request for a multi-contact user device in an IMS enabled network is proposed. The method comprises the step of registering multiple user agents for one and the same user device, wherein from each user agent contact information including a device ID identifying the user device is provided; and further comprising the step of processing a communication request directed towards the user device. The processing step comprises the sub-step of identifying multiple identical device IDs of registered contacts suitable for terminating the communication towards the user device, and the sub-step of treating the communication request according to a predetermined handling scheme related to the detection of identical device IDs.

The device IDs provided to the S-CSCF or a similar network node during registration of the user agents allow the early detection of undesirable situations, for example forking or redirecting an incoming session to in fact one and the same user device. Typically, a detection routine for identical device IDs might have to be applied when prior steps (e.g. evaluating user capability or q-value) result in more than one contact possibility.

The predetermined handling scheme may comprise an instruction to forward the communication request to only one of the contacts comprising identical device IDs. This might be a randomly chosen contact from the two or more detected contacts with identical device IDs, or a more elaborated decision logic might be applied (which includes, e.g., other parameters of a contact profile). In addition, or alternatively, the predetermined handling scheme may comprise an instruction to not redirect a communication request at busy between contacts comprising identical device IDs.

In further variations, the predetermined handling scheme is configurable by at least one of a network operator and the user. For example, the operator might configure the feature of detecting contacts with identical device IDs in a standard manner, which the user is allowed to change according to his/her personal need (for example, by adjusting the q-value to a particular value).

The invention can be implemented as hardware, software or as a combination thereof. Regarding a software aspect, a computer program product comprising program code portions for performing the steps of the above-described methods when the computer program product is run on one or more computing devices is proposed. The computer program product may be stored on a computer readable recording medium.

According to a further aspect of the invention, a user agent acting as a terminating point for a communication from an IMS enabled network is proposed. The user agent is adapted to provide a device ID during registration to the IMS domain, the device ID identifying a user device the user agent is associated with. The user agent will typically be a piece of software which can be written in the Java programming language which is, amongst others, popular for implementing features in mobile telephones. Of course, the user agent might also be hardware-based or might be implemented as firmware.

The user agent may be further adapted to provide a predetermined user capability suitable for the delivery of CS services via the IMS domain during registration to the IMS domain. This might be particularly useful for user agents designed specifically for the purposes of the invention, for user agents located in the network, but also for agents implemented on the user device, to simplify the configuration of the device.

According to a further aspect of the invention, a user device is proposed, having a user agent incorporated as described before. As an example, a mobile equipment (telephone, notebook, but in general also personal computers or other computing devices which are not per se 'mobile') might have implemented a IMS client including a user agent for allowing the setup of a session with the IMS domain of a mobile or non-mobile network. The session might be transported via WCDMA, GPRS, WLAN, or WiMax. In any case, the user agent will provide its contact attributes including the device ID to the IMS domain.

According to still another aspect of the invention, a user device is proposed, having a user agent as described before associated therewith, the user agent being located in the network. Here, user device and user agent are physically separated, and the communication protocols between agent and device depend on the specifics of the scenario. The user device may for example incorporate a CS client, and the user agent then acts for the CS client. In that case, the communication between user agent and user may rely on the CS-based protocols as specified for example in the TS 24.008.

The user device may have further user agents incorporated and/or associated therewith. Examples comprise a device including a SIP-enabled IMS client as well as a SIP-enabled CS client, or a device including two IMS clients, working e.g. via WCDMA on the one hand and WLAN on the other.

According to a further aspect of the invention, a network gateway is proposed for a data exchange between a user device incorporating a CS client, the latter being adapted for a data exchange with a CS domain of the or any network, and an IMS domain of the network, the gateway incorporating a user agent as described above. This gateway permits users to access services in the IMS domain from ordinary CS phones over the CS access. In addition to hosting a (typically SIP) user agent serving the CS client in the CS phone, the gateway might perform one or more of the following functions: an interworking between TS 24.008/ISUP and SIP for calls/sessions; at least a subset of functions of a P-CSCF; gsmSCF (GSM Service Control Function) for static call routing; and control of a media gateway (MGW). The gateway can be provided as a standalone device or it can be co-located with an MSC.

According to a still further aspect of the invention, a serving node in an IMS enabled network for controlling a communication request for a multi-contact user device is proposed. The serving node is adapted for the registration of multiple user agents for one and the same user device, wherein from each user agent contact information including a device ID identifying the user device is provided. The serving node is further adapted to process a communication request directed towards the user device. The processing comprises the step of identifying multiple identical device IDs of registered contacts suitable for terminating the communication towards the user device. The processing further comprises the step of treating the communication request according to a predetermined handling scheme related to the detection of identical device IDs. The serving node might for example be the S-CSCF in an IMS domain of a mobile network.

BRIEF DESCRIPTION OF THE DRAWINGS

In the following, the invention will be described with reference to exemplary embodiments illustrated in the figures, wherein.

DETAILED DESCRIPTION OF PREFERRED EMBODIMENTS

In the following description, for purposes of explanation and not limitation, specific details are set forth, such as particular network topologies, communication protocols etc., in order to provide a thorough understanding of the current invention. It will be apparent to one skilled in the art that the current invention may be practised in other embodiments that depart from these specific details. For example, the skilled artisan will appreciate that the current invention may be practised with a signalling and control protocol different from the SIP standard discussed below to illustrate the present invention. Also, the invention may be practised over various access networks differing from the PS and CS access discussed below.

Those skilled in the art will further appreciate that functions explained herein below may be implemented using individual hardware circuitry, using software functioning in conjunction with a programmed micro processor or a general purpose computer, using an application specific integrated circuit (ASIC) and/or using one or more digital signal processors (DSPs). It will also be appreciated that while the current invention is described as a method, it may also be embodied in a computer processor and a memory coupled to a processor, wherein the memory is encoded with one or more programs that perform the methods disclosed herein.

Figure 1:
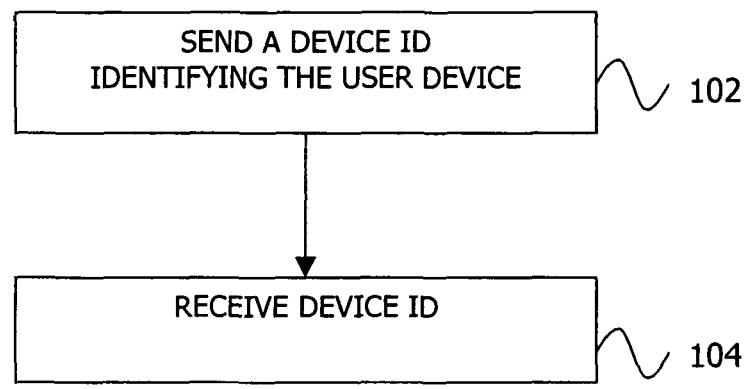
FIG. 1 is a flowchart illustrating a first method embodiment of the invention

With reference to FIG. 1, a flowchart 100 illustrates the steps of a first method embodiment of the invention, namely the registration of two or more user agents associated with a single multi-contact user device in an IMS enabled network.

In a first step 102, each user agent sends a device ID to the IMS domain. The device ID uniquely identifies the user device associated with the user agent. In a second step 104, the respective device ID is received in the IMS domain. In this way, each user agent provides the device ID to the IMS domain during registration.

Figure 2:
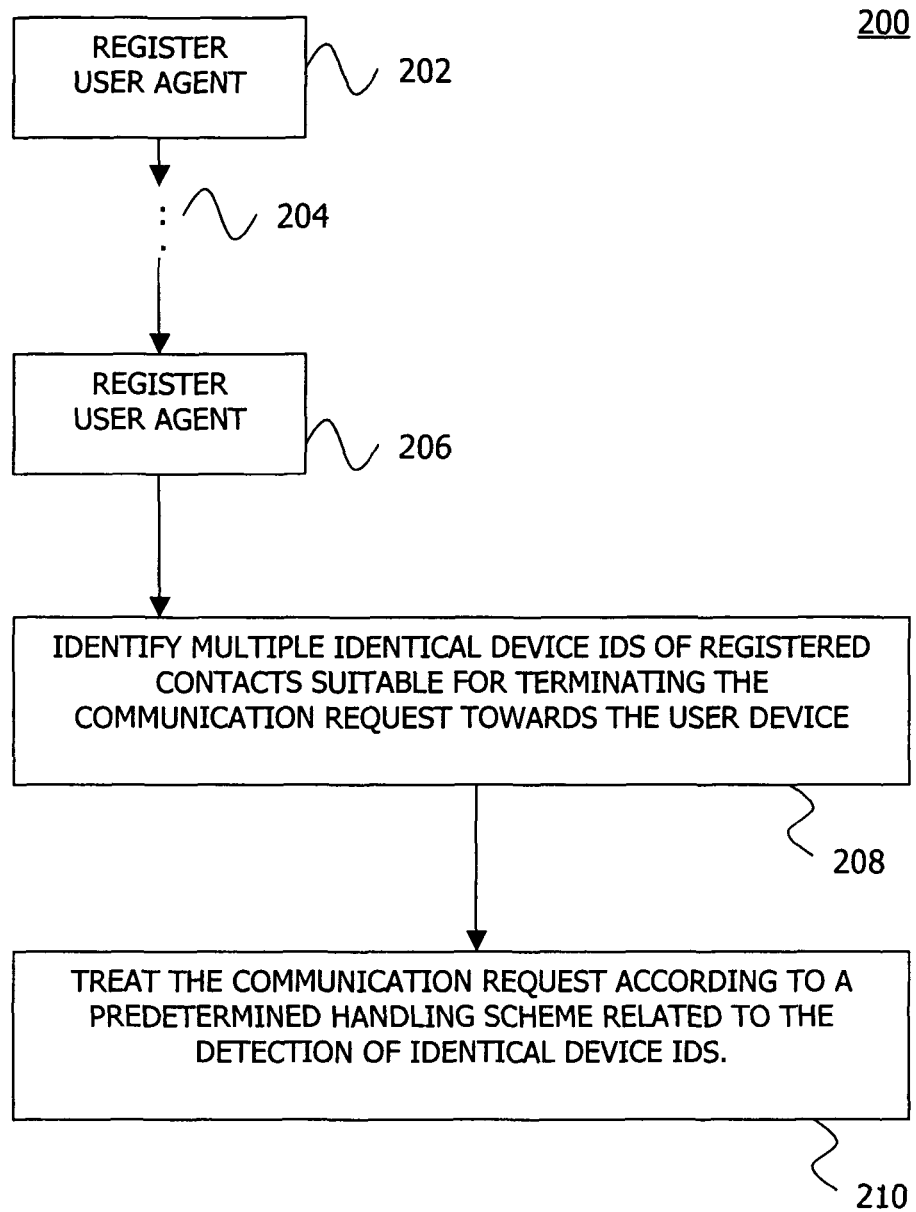
FIG. 2 is a flowchart illustrating a second method embodiment of the invention

With reference to FIG. 2, a flowchart 200 illustrates the steps of a second method embodiment of the invention, namely the controlling of a communication request for a multi-contact user device in an IMS enabled network.

In a first step 202, a user agent is registered in the network. In further steps 204, 206, further user agents are registered in the network. The steps 204 are not explicitly shown and might comprise the registration of zero or more user agents in addition to the agents registered in steps 202 and 206. During registration, each user agent provides contact information including a device ID, which identifies the user device.

In further steps 208, 210, a communication request, which is directed towards the user device, is processed. Step 208 comprises identifying (or detecting) multiple identical device IDs of registered contacts suitable for terminating the communication request towards the user device. Step 210 comprises treating the communication request according to a predetermined handling scheme related to the detection of two or more identical device IDs.

Figure 3:
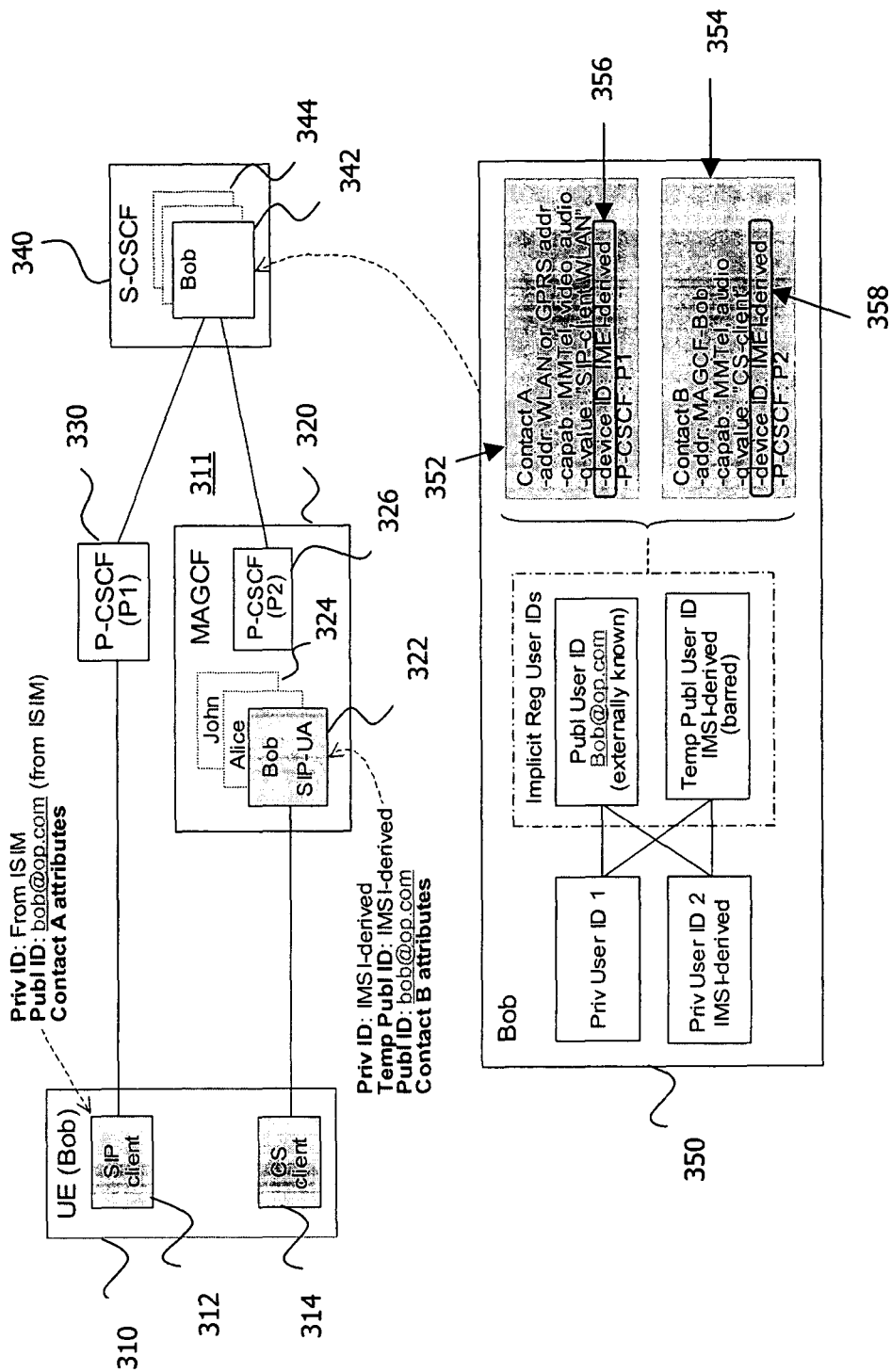
FIG. 3 is a schematic diagram showing a first system embodiment of the invention

FIG. 3 schematically illustrates the network entities including a user device which are involved in a further embodiment of the invention. A user device (or user equipment, UE) 310 is used by user Bob. The device includes a SIP client 312 for PS access to an IMS domain 311 of a mobile network. The SIP client (i.e. the SIP user agent) is associated with a Private ID derived from the ISIM (IP Multimedia Services Identity Module) as well as a public ID 'bob@op.com', which is formed like an email-address, but could also be a number (similar to a phone number) or any other identifier. Further, the user agent has a number of contact attributes associated therewith, which will be discussed below. The contact profile is termed "Contact A for the user Bob".

The user device 310 further comprises a CS client 314 for communicating over a CS domain of a mobile network (not shown). In addition, the CS client 314 can connect to an entity 320 in the mobile network, which will be described next. The connection between client 314 and entity 320 is CS-based, i.e. CS protocols will be used for setup, control and termination of the connection. The protocols might include ISUP for a connection leg between a radio access network and the entity 320.

The entity 320 is a media access gateway control function (MAGCF). Generally speaking, the MAGCF 320 performs interworking primarily for registration and call related functions. One of its tasks is to host SIP user agents 322, 324 for different user devices. The user agent 322 communicates with the CS client 314 within the device 310 of user Bob and, on the other hand, communicates as a SIP client with further entities of the IMS domain 311. As private ID, the user agent 322 has an IMSI-derived value associated therewith. The same holds for the temporary public ID. Alternatively, the private ID and the temporary public ID could not be derived from the IMSI but generated otherwise. The permanent public ID in this example is identical to the public ID associated with user agent 312 within the user device 310. The user agent 322 has a number of contact attributes associated therewith, which will be discussed below. Its contact profile is termed "Contact B for the user Bob" for purposes of the further discussion.

In addition to hosting user agent 322 for user Bob, the MAGCF 320 may host a large number of further user agents for other users; two further user agents 324 are exemplarily outlined. The MAGCF further includes a P-CSCF 326, which works as a Proxy for the user agents 322, 324.

The IMS domain 311 further comprises a stand-alone Proxy-CSCF 330, working as a Proxy for the SIP client 312 on the user device 310. A further CSCF 340 works as a serving entity (S-CSCF) for the user Bob (and possibly other users as well). The S-CSCF 340 thus controls sessions related to the corresponding user agents 312, 322. The IMS domain 311 may comprise part of the user's home network.

The SIP clients 312, 322 have to register in the IMS domain 311 (more precisely with the S-CSCF 340) for being able to initiate session requests or for being reachable for session requests initiated by other users. To this end, in a registration procedure, the corresponding agents have to provide their contact profiles (or, in short, contacts) A and B, respectively, to the S-CSCF 340, which stores the contacts in a subscriber- or user-related way, as indicated by the object 342 named 'Bob'. Of course, many other users may have their user agents registered at the S-CSCF 340, which is indicated by a further object 344.

Object 342 'Bob' is shown in more detail as enlarged structure 350 in FIG. 3, illustrating schematically some of the content of this object 342. The object holds the private user IDs of user Bob as well as public permanent and temporary user IDs. Further, the object contains the contacts A and B (reference numerals 352, 354) which have been provided by the user agents 312, 322 during registration.

Contact A 352 specifies parameters for a session that is terminated on one side by the SIP client 312 on the user device 310. The contact address might be a WLAN or GPRS address. The user capability is 'Multimedia telephony with video, audio'. As priority or q-value, the user agent is indicated as 'SIP-client WLAN'. As a Proxy, CSCF 330 is specified.

Contact B 354 specifies as address the network-based MAGCF 320. As capability, 'Multimedia telephony, audio only' is specified, as communication data have to be transported via CS-access mechanisms between user agent 322 and CS-client 314 on the user device 310. The q-value is chosen as 'CS-client' accordingly. As a Proxy, the CSCF 326 located in the MAGCF 320 is specified.

Of particular interest for the understanding of the present embodiment is the device ID 356, 358, which forms part of each of the contact profiles A, B and as such has also been transferred from the user agents 312, 322 to the S-CSCF 340 during registration.

It is exemplarily assumed here that the user device 310 has an IMEI (International Mobile Equipment Identity) associated therewith. This is the case for example for mobile telephones. An IMEI consists of an information representing the manufacturer and a serial number, and as such constitutes an ID which uniquely identifies the user device among all mobile phones which ever have been manufactured (and which will be manufactured in the future). However, for the purposes of the invention, an identification of the device unique within the context of session control related to the IMS domain of a particular (mobile) network would also be suitable.

Therefore, in principle, an identifier which is unique in the network would also suffice. It might however be more efficient to rely on the existing IMEI instead of introducing a further identification scheme. For devices which do not possess an IMEI, other mechanisms will have to be used. One might for example also use the IMSI (International Mobile Subscriber Identity) of the user for the purposes of the present embodiment. As here the unique identification is assigned to the user, more precisely his (U)SIM-card, and not directly to the user device, one and the same subscriber may use several IMSIs inside or associated with one and the same device. However, these cases at present appear to be not of high relevance and can be solved by appropriately configuring the user agents and/or the responsible IMS components.

Of course, other global permanent identifiers might be used for the purposes of the invention. 'Global' in this respect means 'unique' at least with respect to the network the user device is attached to, and the network comprising in general all interrelated entities under the control of the network operator the user or subscriber is subscribed to, although other configurations are also possible.

In the example depicted in FIG. 3, the IMEI of the user device 310 is used by the user agent 312 located inside the device to derive the device ID. The user agent 322 located in the IMS-domain 311 also derives the device ID from this IMEI. In general, it will be advantageous if both or all user agents use the same scheme to derive the device ID. For example, the simplest possibility is to directly use the IMEI. Where this is not desired, for example due to limitations in storage or processing capacity or due to security reasons, a scheme might for example be used which is similar to producing a hash value of a data set to be signed or encrypted in the field of IT security.

The user agent 322 in the MAGCF 320 might have received the IMEI via a CS-based communication with the CS client 314 on the user device 310, or the device ID might have been configured directly by the operator when implementing the user agent 322 in the MAGCF 320.

In the present embodiment, both user agents 312, 322 use the same scheme to derive the device ID. Therefore, the device IDs 356, 358 are identical to each other. In the following, with respect to FIG. 4, the usage of such device IDs by a session control functionality according to a further embodiment of the invention will be described.

Figure 4:
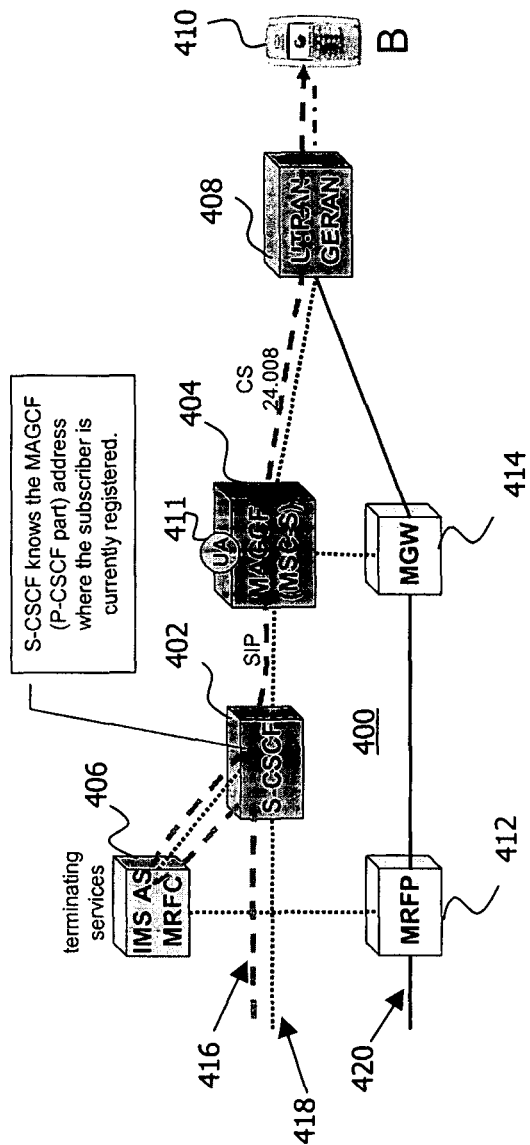
FIG. 4 is a schematic diagram showing a second system embodiment of the invention

FIG. 4 schematically illustrates a mobile network 400, in which the IMS domain (which might be identical to the IMS domain 311 in FIG. 3) is represented by a CSCF 402 acting as a serving CSCF, a MAGCF 404 co-located with a serving MSC and an IMS Application Server and MRFC (Multimedia Resource Function Control) 406. The mobile network 400 further comprises user data transport capabilities, represented by MRFP ((Multimedia Resource Function Processor) 412 and Media Gateway 414, and a radio access network (RAN) for UMTS/GRPS (UTRAN/GERAN) 408. User data is forwarded along paths designated by reference numeral 420, whereas signalling/controlling data are forwarded along paths 416, 418.

It is assumed here that the user device 410 is identical to the one shown in FIG. 3, belonging to user Bob. A corresponding user agent 411 is located in the MAGCF 404 which is associated with the user device 410. The user agent 411 communicates with a CS client (not shown) of the user device 410 and other subsystems of the device 410 via CS-based communication protocols, as indicated by (TS) 24.008. Towards the IMS domain of the network 400, SIP is used as control protocol to, for example, register the user agent 411 at the S-CSCF 402.

In general, a call directed towards user Bob (more precisely towards a user agent associated with the user device 410 of user Bob), will be routed to the S-CSCF 402. The S-CSCF 402 will involve the IMS AS 406, which in turn will trigger execution of terminating services. The S-CSCF 402 knows the address of the MAGCF 404 serving the user device 410. The MAGCF 404 also comprises a P-CSCF (not shown), which is the P-CSCF designated in the contact profile of the user agent 411.

In case of multiple (active) registrations, a decision in the S-CSCF 402 is required to which of the P-CSCFs an incoming session request has to be forwarded. It is assumed here that the incoming call requires as user capability 'audio' (voice, speech), which is fulfilled by 'Multimedia telephony with video, audio' as well as 'Multimedia telephony, audio only'. Contact A and Contact B of FIG. 3 with these capabilities therefore qualify both for forwarding the request to their addresses resp. P-CSCFs.

The S-CSCF 402 will typically check the q-value of each of contacts A and B and select the contact with the highest q-value. In case of contacts having the same q-value, according to the prior art, forking (parallel ringing) can be applied.

If, like in the present embodiment, both contacts are associated with one and the same user device, forking does not work properly.

According to the present embodiment, the S-CSCF 402 thus additionally checks the device IDs contained in the two qualifying contacts. From FIG. 3 it is clear that the device IDs are identical. In that case, additional logic is required in the S-CSCF 402 in order to, for example, forward a request to only one of these contacts and/or avoid redirecting a session at 'User busy' from one contact to the other (as both contacts represent the same device).

The contact attribute "device ID" may be a mandatory or an optional feature, for example to allow the parallel usage of SIP clients enabled and (conventional) SIP clients not enabled for providing a device ID in a network. In the optional case, the S-CSCF has to deal with situations in which no device ID has been provided by a registering user agent. One possibility is then to assume that a contact without device ID is qualified as not to be considered further, alternatively it is qualified as to be considered further.

In any case, in a final step, the S-CSCF has a list of two or more contacts, qualifying in parallel for forwarding the communication (session) request and containing the same device ID (or being assumed to have the same device ID in case of missing device ID). In the embodiment described here, this is the case for the contacts A and B. The S-CSCF 402 thus has to decide which of these contacts to use for forwarding the request.

This decision will be based on a predetermined prescription or handling scheme. In many cases it might be useful that the handling scheme comprises an instruction to forward the communication or session request to only one of the contacts comprising identical device IDs. The decision to which one of the qualifying contacts the request is to be forwarded might rely on a further inspection of contact attributes, on other user data available at or in association with the S-CSCF, or might simply be done by choosing the 'first' in the list of contacts. The advantage of the present embodiment, namely to avoid undesired forking of the session to one and the same physical device, is achieved in any of these cases.

In the example described here, the S-CSCF 402 might thus decide to use the attributes of contact A, which leads to a forwarding of the request only via the P-CSCF located inside the MAGCF 404 to the user agent 411. The forwarding via another P-CSCF towards a user agent located on the mobile phone 410 (not shown in FIG. 4) is suppressed. The audio data will then be forwarded via the transport nodes 412, 414.

After the session or call has been routed to the P-CSCF included in the MAGCF 404, the MAGCF 404 will terminate the call towards the user device 410 without invocation of any service.

The predetermined handling scheme used in the S-CSCF 402 to decide on qualifying contacts for identical devices might additionally or alternatively comprise an instruction to not redirect a communication at 'busy' between contacts comprising identical device IDs. This avoids ringing e.g a notebook, smartphone or other mobile equipment when the user is momentarily busy with, for example, another phone call.

The predetermined handling scheme discussed above can be configurable by the operator. For example, it can be applied dependent on the user category, e.g. 'normal' user or 'premium' user (in case the network operator generally decides to offer this feature as optional). The handling scheme might also be implemented as being configurable by the user, as might be the case for q-values of his user agents to have sessions delivered to the preferred SIP-contact. Generally, though, an operator based configuration appears to be preferable, as, for example, in general a transmission of unnecessary data over the radio interface is to be avoided for reasons of physically limited bandwidth. Thus, an operator might prefer to configure the radio access in a way that unnecessary forking is avoided, without giving the user the possibility to influence this aspect. However, some additional or optional sub-features related to the service feature might as well be configurable for the user, for example the redirection at 'busy'.

Although the description above has assumed two registered contacts for the same device, of course the invention applies equally well to other cases with more than one registration for the same device. For example, there might be three user agents associated with a mobile telephone, one agent serving a CS client on the phone, one agent for PS access via WLAN and one agent for cellular PS access. Some or all of these user agents may possess a registration in the IMS domain for multimedia telephony. In other cases a PS access might be used to get access to a CS domain of a mobile network. In that case the user device is reachable from the CS domain simultaneously via both CS and PS access. It is clear for the skilled person that many further scenarios are possible.

The invention disclosed in the foregoing allows an IMS enabled network to terminate a communication request directed towards a user device in a well-defined way, even for cases where multiple registrations in the IMS domain are present which are related to the same physical user device.

While the current invention has been described in relation to its preferred embodiments, it is to be understood that this disclosure is for illustrative purposes only. Accordingly it is intended that the invention be limited only by the scope of the claims appended hereto.

The invention claimed is:

1. A method of registering, in an IP Multimedia Subsystem (IMS), enabled network, two or more user agents associated with a single multi-contact user device, the method comprising:
   associating each user agent with the single multi-contact user device, wherein the single multi-contact user device has unique user device identification (ID) that is unique to the single multi-contact user device, wherein the unique user device ID is derived from a global permanent identifier associated with the user device;
   wherein at least one of the two or more user agents has an overlapping capability with another at least one of the two or more user agents; and
   providing, by each user agent, the unique user device ID to the IMS enabled network during registration of the user agent;
   wherein when a communication request is directed towards the multi-contact user device, a serving node in the IMS enabled network manages the communication request according to a predetermined handling scheme that prevents redirection of the communication request from one registered contact to another in response to the detection of identical user device IDs.

2. The method according to claim 1, wherein one of the user agents is located in the user device.

3. The method according to claim 1, wherein at least one of the two or more user agents is located in the IMS enabled network and acts for a circuit switched (CS) client in the user device.

4. The method according to claim 1, wherein the user agents additionally provide a predetermined user capability value suitable for the delivery of circuit switched (CS) services via the IMS enabled network.

5. A method, using a Media Access Gateway Control Function (MAGCF), of controlling a communication request for a multi-contact user device in an IP Multimedia Subsystem (IMS) enabled network, the user device being identifiable by a unique device identification (ID), the method comprising:
   deriving the unique user device ID from a global permanent identifier associated with the user device;
   registering multiple user agents for the user device, wherein the registering comprises providing, by each user agent, the unique user device ID to the IMS enabled network, wherein at least one of the multiple user agents has an overlapping capability with another at least one of the multiple user agents; and
   processing a communication request directed towards the user device, the processing comprising:
   detecting multiple identical device IDs of registered contacts suitable for terminating the communication request towards the user device, and
   treating the communication request according to a predetermined handling scheme that prevents redirection of the communication request from one registered contact to another in response to the detection of identical device IDs.

6. The method according to claim 5, wherein the predetermined handling scheme comprises an instruction to forward the communication request to only one of the registered contacts comprising identical device IDs.

7. The method according to claim 5, wherein the predetermined handling scheme comprises an instruction to not redirect a communication between contacts comprising identical device IDs at 'busy'.

8. The method according to claim 5, wherein the predetermined handling scheme is configurable by at least one of an operator and a user.

9. A communication system comprising:
   a serving node in an IP multimedia Subsystem (IMS) enabled network; and
   at least two user agents each acting for a single multi-contact user device;
   wherein a unique user device identification (ID identifies the single multi-contact user device as a terminating point for a communication from the IMS enabled network, wherein the unique user device ID is derived from a global permanent identifier associated with the user device;
   wherein each user agent is configured to provide the unique user device ID to the IMS enabled network during registration of the user agent with the IMS enabled network;
   wherein at least one of the two or more user agents has an overlapping capability with another at least one of the two or more user agents; and
   wherein when a communication request is directed towards the multi-contact user device, the serving node in the IMS enabled network is configured to manage the communication request according to a predetermined handling scheme that prevents redirection of the communication request from one registered contact to another in response to the detection of identical user device IDs.

10. The system according to claim 9, wherein each user agent is configured to provide a predetermined user capability suitable for the delivery of circuit switched (CS) services via the IMS enabled network during registration to the IMS enabled network.

11. The system according to claim 9, further comprising the user device, the user device comprising at least one of the user agents.

12. The system according to claim 9, wherein the user device incorporates a circuit switched (CS) client and at least one of the two or more user agents is located in the IMS enabled network and acts for the CS client.

13. The system according to claim 11, wherein the user device has further user agents incorporated and associated therewith.

14. The system of claim 9, further comprising a gateway incorporating one of the user agents.

15. A serving node in an IP Multimedia Subsystem (IMS) enabled network for controlling a communication request for a multi-contact user device that is uniquely identifiable by a unique user device identification (ID) derived from a global permanent identifier associated with the user device, wherein:
   the serving node is configured to register multiple user agents for the user device, wherein from each user agent, contact information including the unique user device ID is provided by each user agent during registration, and at least one of the multiple user agents has an overlapping capability with another at least one of the multiple user agents; and
   the serving node being is further configured to:
   process a communication request directed towards the multi-contact user device;
   detect multiple identical unique user device IDs of registered contacts suitable for terminating the communication towards the user device; and
   manage the communication request according to a predetermined handling scheme that prevents redirection of the communication request from one registered contact to another in response to the detection of identical device IDs.

* * * * *